Oct. 24, 1967 H. E. PEREZ 3,348,637
SELF-ENERGIZING DISC BRAKES
Filed Oct. 21, 1965

INVENTOR
Horacio E. Perez
BY Polachek & Saulsbury
ATTORNEYS

3,348,637
SELF-ENERGIZING DISC BRAKES
Horacio E. Perez, 612 Lake Elizabeth Drive,
Winter Haven, Fla. 33880
Filed Oct. 21, 1965, Ser. No. 499,136
2 Claims. (Cl. 188—152)

This invention relates to the art of disc brakes and more particularly concerns self-energizing disc brakes which can be installed on various types of motor driven wheels, such as those of motor vehicles.

The invention relates to an improved type of disc brake arranged in such a way that brake pedal pressure and pedal travel required to operate the brake are significantly reduced. The invention provides the advantages of disc brakes plus the larger friction areas provided in drum type brakes. In addition the brakes are self-energizing. The self-energizing feature is hydraulically-operated and under direct control of the hydraulic brake system of a vehicle. The disc brakes embodying the invention are relatively simple in structure. They can easily be installed on wheels of vehicles and can easily be modified and adapted for use in many types of motor vehicles. While the invention is especially intended for motor vehicles, it is of general application and may be used in other machines, including stationary engines being provided with hydraulically operating brake systems.

Among the important objects of the invention are the following:

(1) To provide a disc brake with larger friction area than brakes of similar type;

(2) To provide a disc brake requiring less pedal pressure to operate than a conventional disc brake;

(3) To provide a disc brake which is self-energizing and having an internal assist arrangement, so that it can be operated with less effort than ordinary brakes to produce a stronger, more effective braking action;

(4) To provide a disc brake which is sturdy, compact and easily adapted for use on all four wheels of a vehicle.

(5) To provide a disc brake which permits incorporation of parking brakes;

(6) To provide a disc brake which can be installed in tandem or multiple arrangement on a wheel;

(7) To provide a disc brake which provides forced ventilation for maximum dissipation of heat;

(8) To provide a disc brake which is simple in design, inexpensive to manufacture and easy to maintain and service.

For further comprehension of the invention, and of the objects and advantages thereof, reference will be had to the following description and accompanying drawings and to the appended claims in which the various novel features of the invention are more particuarly set forth.

Figure 1:
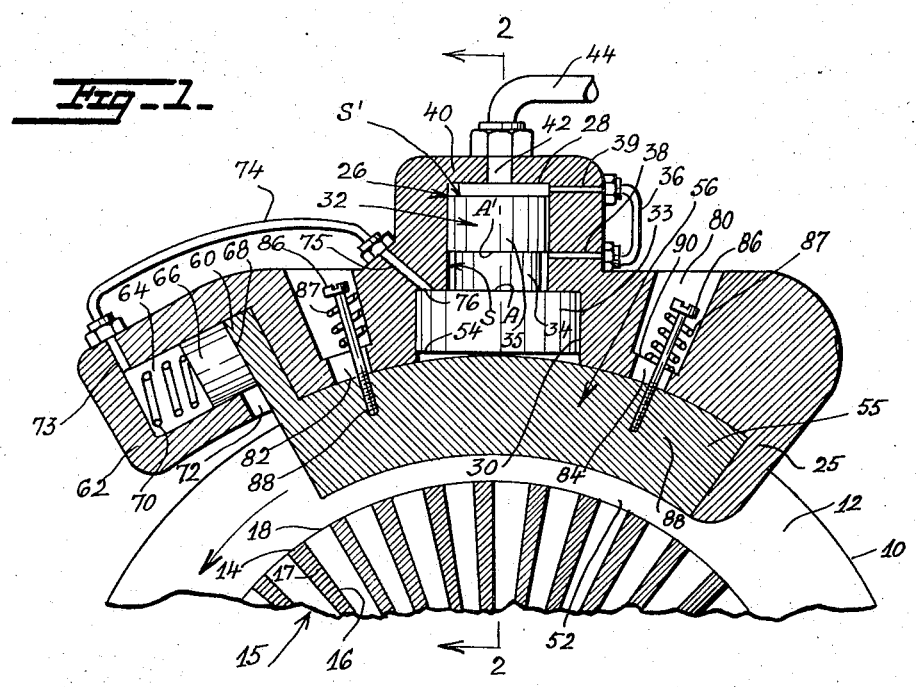
Figure 2:
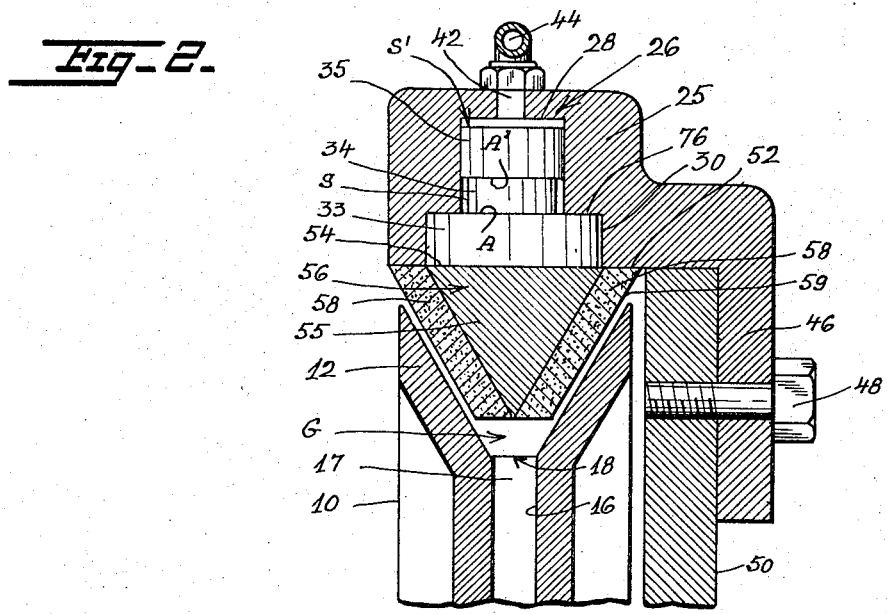

In the accompanying drawings forming a material part of this disclosure:

FIGURE 1 is a side view of a brake assembly embodying the invention, shown partially in longitudinal central vertical section, and FIG. 2 is a fragmentary vertical cross-sectional view taken on line 2—2 of FIG. 1 in a plane perpendicular to the plane of section of FIG. 1.

Referring now to the drawings there is shown a circular brake disc 10. This disc has a circumferential, generally V-shaped groove G, FIG. 2, with two outwardly flaring annular walls 12 and radially-extending slots 16. The disc may be made as a one-piece casting with central circular body 15 integrally joined with walls 12. Radially-extending slots 16 are formed with walls 12 at their periphery and define a multiplicity of ventilating fins 17. These slots 16 are open at their outer ends to define a multiplicity of apertures 18 in the periphery of body 15.

A brake block 25 is shown in the assembly of FIG. 1. The brake block has a cylinder or cavity 26 therein. This cavity has an outer cylindrical section 28 and an inner adjoining cylindrical section 30. Section 28 is narrower in diameter than section 30. The sections are axially aligned and disposed radially of disc 10. Slidably disposed in the cavity 26 is a piston 32. This piston has three cylindrical sections 33, 34 and 35. Inner section 33 is located in cavity section 30 and has substantially the same diameter. Outer sections 34 and 35 are located in cavity section 28. The intermediate section 34 is smaller in diameter than outermost section 35 which has substantially the same diameter as cavity section 28. This defines an annular space S between sections 34 and cavity section 28. Axially outer and inner spaced portions of cavity section 28 are connected via a conduit 36 which is fitted at opposite ends thereof to two transverse bores 38, 39 opening into the cavity section 28 in axially spaced positions. The outer end wall 40 of the block has a port 42 to which is connected a conduit 44. Conduit 44 extends from the master hydraulic brake cylinder (not shown) or other hydraulic fluid supply in the braking system of the machine where the brake assembly is installed.

Block 25 has a massive lateral wall 46, FIG. 2, secured by one or more bolts 48 to a stationary part of the vehicle such as a wheel support member 50. The radially inner side 52 of the block is cylindrically curved. The inner face 54 of piston section 33 is flat and normally bears on an annular core 55 of a brake shoe 56. This core is triangular in cross section. Attached to opposing angularly disposed annular sides of the core 55 are two annular brake linings 58. These linings are parallelogrammic in cross section as clearly shown in FIG. 2. The angular spacing of the outer sides 59 of the brake linings 58 and of the outer sides of the core 55 is the same as that of the flaring facing side walls 12 of the disc 10. The core and linings are normally spaced from the sides 12 of disc 10 except when braking pressure is applied. Brake shoe 56 extends approximately ninety degrees to one hundred twenty degrees circumferentially of disc 10.

Core 55 has an arm 60 which extends radially outwardly and fits into a circumferential extension 62 of block 25. In extension 62 is a cylindrical cavity 64. A piston 66 is axially slidable in cavity 64. One end of piston 66 bears against the flat side 68 of arm 60. A coil spring 70 in cavity 64 bears against the other side of piston 66. Arm 60 is movable circumferentially of the disc 10 in a slot 72 formed in block extension 62. Cavity 64 is connected via a conduit or fluid line 74 to an obliquely extending bore 75 formed in block 25. Bore 75 opens into cavity section 30 at annular shoulder 76 formed at the outer axial end of cavity section 30. Two circumferentially spaced bores 78, 80 are formed in block 25 at opposite sides of the cavity 26. These bores are open to the outer side of core 55 via narrow slots 82, 84. Screws 86 are engaged in threaded holes 88 in the core 55. Coil springs 87 on the shanks of the screws bear on the bottoms 90 of the bores and at the undersides of the screwheads 92. Screws 86 can move axially and transversely in slots 82, 84.

In operation of the brake assembly, when the brake pedal of the braking system is applied, fluid is forced out of the master cylinder and flows through the line or conduit 44 and port 42 into space S' in the upper chamber or cavity section 28. Since ports or bores 38, 39 and conduit 36 connect upper and lower cavity sections or chambers of cavity section 28 the pressure and/or fluid will be transferred to cylinder 64 by way of the space S surrounding the piston section 34, port or bore 75, line 74 and port or bore 73. Therefore the pressure within both cylinders 26 and 64 as well as throughout the system will be equalized.

As the pressure in the brake system is increased, piston 32 will move axially inward sealing port 38 and thus closing the connection between the outer and inner cavity sections of cylinder 26. The inward movement of piston 32 will force brake shoe 56 against the rotating disc 10 which in turn, because of friction, will impart a load on brake shoe 56 in the direction of disc (and wheel) rotation. This load will be transferred by arm 60 of brake shoe 56 to piston 66 in cylinder 64. Any forward movement of piston 66 will displace fluid which will be forced through port 73, line 74, and port 75 into the inner chamber or cavity section 30 of cylinder block 25. Since the annular depressing area A at the waist section 34 of piston 32 is much greater than the lifting area A' the resulting movement will be axially inward thus supplementing the direct pressure applied to the outer side of piston 32 by the action of the brake pedal of the braking system. Thus, the greater the pedal pressure, the greater the load transferred to piston 66 in cylinder 64, and the greater the "assist." It should be noted that movement of piston 66 is effected by circumferential movement of the brake shoe on engaging the disc 10. Application of the "assist" pressure is instituted upon circumferential movement of the brake shoe by the disc 10 and is not determined by the absolute magnitude fluid pressure at the master cylinder. The arc shaped brake shoe permits a larger friction area possible for a given brake while the wedge shape of the shoe with its two brake linings doubles this area.

During the rotation of the disc 10, the fins 14 produce a ventilating effect. The disc acts as a centrifugal air pump. Air is forced out of slots 16 between the opposing friction surfaces of the brake shoe and disc. This provides forced ventilation and results in maximum dissipation of the heat created when the brakes are applied.

As the brakes are released the fluid returns to the master cylinder. The pressure on piston 32 is relieved and the compression springs 87 at guide pins or screws 86 will in turn retract the brake shoe 56 away from disc 10.

Brake shoe 56 will in turn force piston 32 axially outward to return to its normal position shown in FIGS. 1 and 2. The fluid in the lower or inner chamber of cylinders 28 and 30 will return to the cylinder 64 and together with the action of spring 70, will force piston 66 back and with it brake shoe 56. Brake shoe 56 during operation thus moves radially inward and circumferentially counter-clockwise as viewed in FIG. 1 while brake fluid pressure is applied, and moves radially outward and circumferentially clockwise when brake fluid pressure is released. At this point, port 38 at cylinder 26 will be open connecting space S' with space S in cavity section 28 at opposite ends of piston section 35, and pressure throughout the system will be equalized.

It should be apparent that it is possible to design the brake block with more than one cylinder if necessary for heavy duty systems. Thus the present brakes can be installed to replace conventional, ordinary disc brakes.

While I have illustrated and described the preferred embodiments of my invention in connection with the brake system of a motor vehicle, it is to be understood that I do not limit myself to the precise constructions herein disclosed and that various changes and modifications may be made within the scope of the invention as defined in the appended claims.

What is claimed is:
1. A brake assembly comprising:
(a) a rotatable disc having a peripheral generally V-shaped circumferential groove defined by two annular outwardly flaring opposing side walls;
(b) a brake block mountable in a fixed position to a support, said block having a cylindrical first cavity formed therein open toward said disc and extending axially in a direction radial to said disc, said cavity having adjoining radially outer and inner cylindrical sections with the inner section larger in diameter than the outer section;
(c) means for mounting said disc rotatably to said support;
(d) a multiple-section cylindrical first piston movable axially in said cavity radially of said disc, said piston having a first cylindrical piston section disposed in the inner cavity section, with second and third piston sections disposed in the outer cavity section, the diameters of said first and third piston sections being substantially equal in diameter to those of the inner and outer cavity sections respectively, said second piston section being located between the first and third piston sections and having a diameter smaller than that of the outer cavity section to define a cylindrical space therewith;
(e) said block having an extension extending circumferentially of said disc with a cylindrical second cavity formed therein;
(f) a spring biased second cylindrical piston movable axially in said second cavity;
(g) first fluid conduit means connected to one end of said first cavity and supplied with fluid from a fluid source;
(h) second fluid conduit means connected at opposite ends to spaced axial points in said outer section of the first cavity;
(i) third fluid conduit means connected between said second cavity and one end of said inner section of the first cavity;
(j) an arcuate brake shoe,
(1) said shoe having a core generally triangular in cross section,
(2) two annular brake linings on opposite sides of said core, said core and linings extending radially into said V-shaped groove in the disc and normally spaced slightly from the side walls thereof;
(3) an arm extending radially from said core into said second cavity and contacting said second piston; and
(k) spring biased guide members movably connecting said brake shoe to said block so that the shoe is movable slightly radially and circumferentially of the disk,
(1) whereby said brake shoe is advanced radially inward of the disc to engage the side walls thereof frictionally when said first piston is advanced axially of said block toward the disc as fluid is forced into said first cavity via said first fluid conduit and
(2) whereby said brake shoe is advanced circumferentially slightly in the direction of rotation of said disc to advance said second piston and fluid pressure from the second cavity through said third fluid conduit means to the inner section of the first cavity, and
(3) whereby one end of the second fluid conduit means is closed by the third section of the first piston when the first piston advances, said one end of the second fluid conduit means being opened when the first piston retracts to equalize pressures in the first and second cavities as the fluid pressure in the first cavity is relieved.

2. A brake assembly according to claim 1, wherein said disc has a circular central body with circumferentially spaced radial fins formed therein to define radial passages therebetween, said side walls of the disc being spaced apart to define a cylindrical peripheral wall, said passages opening at outer ends at said peripheral wall between the side walls of the disc for passing air between opposing faces of said brake linings and said side walls of the disc to dissipate heat generated by friction thereat.

References Cited

UNITED STATES PATENTS 3,237,732   3/1966   Hayes _____ 188—73 X

FOREIGN PATENTS

| 1,187,867 | 2/1965 | Germany. |
| 864,472 | 4/1961 | Great Britain. |
| 951,602 | 3/1964 | Great Britain. |
| 977,318 | 12/1964 | Great Britain. |

FERGUS S. MIDDLETON, *Primary Examiner.*

MILTON BUCHLER, *Examiner.*

G. E. A. HALVOSA, *Assistant Examiner.*